Patented June 9, 1925.

1,541,407

UNITED STATES PATENT OFFICE.

KURT SPANGENBERG, OF JENA, GERMANY, ASSIGNOR TO THE FIRM CARL ZEISS, OF JENA, GERMANY.

OPTICAL ELEMENT.

No Drawing.   Application filed July 20, 1923. Serial No. 652,843.

*To all whom it may concern:*

Be it known that I, KURT SPANGENBERG, a citizen of Germany, and residing at Jena, Germany, have invented a new and useful Optical Element (for which I have filed an application in Germany September 12, 1922), of which the following is a specification.

In the optical glasses hitherto known it has not been possible to attain a lower refractive index than $n_D=1,4637$ and a smaller colour dispersion than corresponding to the value $\nu=70,6$. Besides, these values do not even appear jointly but the value $n_D=1.4637$ is united with the value $\nu=65,6$ and the value $\nu=70,6$ is united with the value $n_D=1,4860$. However, according to the present invention it is possible to carry out optical elements of still lower refraction and still smaller colour dispersion by making them of certain, definite alkaline fluorides. As with the use for optical instruments it is not only the optical properties which are decisive but also certain other properties are indispensable as, e. g. the capacity of resistance to the generally unavoidable moisture of the air, of the alkaline fluorides only crystallized fluoride of sodium and crystallized fluoride of lithium may be used. For these two substances approximately the following values hold good:

|  | $n_D$ | $\nu$ |
|---|---|---|
| Fluoride of sodium | 1,3257 | 84,5 |
| Fluoride of lithium | 1,3915 | 80 |

As regards the relative dispersion these substances suit well to crown glass.

The considerable extension, attained by the introduction of these substances into technical optics of the lines drawn by the former glasses even exceeds those which it has been possible to attain by the use of natural fluorspar. For even if the fluorspar of $\nu=95,1$ shows a still smaller colour dispersion, yet its fraction of $n_D=1,4339$ is considerably higher than that of the aforesaid substances. Hence these substances, whose crystallization can be artificially attained from easily disposable raw materials, cannot only replace in many cases the natural fluorspar which is becoming more and more scarce, but in certain cases (e. g. for the correction of spherical errors) they might be even more suitable than fluorspar. In addition, it is to be anticipated that it will be possible to attain with optical elements of the aforesaid substances together with such of fluorspar effects which are more favourable than those attained hitherto (e. g. for the achievement of an undercorrection of the spherical errors together with an overcorrection of the colour-defects).

Although the subjoined claim only deals with fluoride of sodium, it is also intended to relate to fluoride of lithium.

I claim:

Optical element consisting of crystallized fluoride of sodium.

KURT SPANGENBERG.